May 7, 1968 W. D. WILLIAMS ETAL 3,382,445

BIAS SHIFT COMPENSATION CIRCUITRY FOR TRANSISTORS

Filed July 26, 1966

3 Sheets-Sheet 1

INVENTORS
WALLACE D. WILLIAMS
ZUNG F. CHANG
BY Harry A. Herbert Jr. and George Fine
ATTORNEYS

BIAS SHIFT COMPENSATION CIRCUITRY FOR TRANSISTORS

Filed July 26, 1966 3 Sheets-Sheet 2

CURRENT VS VOLTAGE DROP

QUIESCENT COLLECTOR CURRENT VS CASE TEMPERATURE.
(Vcc =28V. NO SIGNAL)

INVENTORS
WALLACE D. WILLIAMS
ZUNG F. CHANG
BY Harry A. Herbert Jr. and George Fine
ATTORNEYS

BIAS SHIFT COMPENSATION CIRCUITRY FOR TRANSISTORS

INVENTORS
WALLACE D. WILLIAMS
ZUNG F. CHANG
BY Harry A. Herbert Jr. and
George Fine
ATTORNEYS

United States Patent Office 3,382,445
Patented May 7, 1968

3,382,445
BIAS SHIFT COMPENSATION CIRCUITRY FOR TRANSISTORS

Wallace D. Williams and Zung F. Chang, Somerville, N.J., assignors, by mesne assignments, to the United States of America as represented by the Secretary of the Air Force Filed July 26, 1966, Ser. No. 568,073
3 Claims. (Cl. 330—23)

ABSTRACT OF THE DISCLOSURE

Thermal bias shift compensation apparatus for transistors in which a diode is incorporated inside a transistor package with the temperature coefficient of the diode being similar to the base-to-emitter junction temperature coefficient of the associated transistor. The diode is closely spaced to its associated transistor to provide a fast thermal response therebetween to maintain a stable quiescent point and thus provide thermal compensation.

The present invention relates to circuitry compensating for a bias shift of a transistor and more particularly to a transistor with an internally mounted diode to compensate for bias shift due to power dissipation and temperature variation.

The purpose of an internally mounted diode is to provide the necessary bias compensation that is needed in Class A and Class AB linear amplifiers to prevent a shift in operating point and to avoid catastrophic failure due to thermal runaway. Engineering samples have shown that temperature compensation described in this invention is practical. Such a device will find wide usage in linear amplifiers where forward bias is needed, especially in single band applications.

The need for linearity in a single sideband (SSB) transmitter necessitates the use of a Class A or Class AB power amplifier. These inherently inefficient modes of operation can dissipate a considerable amount of power. In a transistor amplifier, heat can alter device parameters and cause catastrophic failure as a result of thermal runaway if the heat transfer cycle becomes regenerative. Thermal runaway can be attributed to the increase in transconductance with rising temperature because of the negative temperature coefficient of $V_{be}$. In SSB applications where the transistor bias is always obtained from a voltage source, it becomes difficult to prevent the transistor collector current from rising at high temperature unless the bias voltage can be made to vary at the same rate as the $V_{be}$ (base, emitter voltage) of the transistor. External emitter resistance can be used for thermal stability for low frequency amplifiers. In a high frequency power amplifier the impedance of an external resistor can become an appreciable portion of the reflected load as seen by the collector, thus limiting the output power. For this reason, the use of an external resistor for thermal stability renders itself impractical in any high frequency power amplifier.

By incorporating inside the transistor package a diode, whose temperature coefficient is similar to the base-to-emitter junction temperature coefficient of the transistor, the quiescent collector current can be maintained relatively constant with temperature variations. Due to the close spacing of the diode to the transistor pellet, a fast thermal response time can maintain a stable quiescent point; prevent the transistor from going into forward bias second breakdown and thermal runaway. Thus, the diode inside the transistor package can be used for temperature compensation.

An object of the present invention is to provide circuitry for compensation of bias shift of a transistor.

Another object of the present invention is to provide a transistor with an internally mounted diode to compensate for bias shift due to power dissipation and temperature variations.

Various other objects, advantages, and features of novelty which characterize the invention are pointed out with a particularity in the claims annexed hereto and forming a part hereof. However, for a better understanding of the invention, its advantages, and objects attained by its use, reference should be had to the subjoining drawings which form a further part hereof, and to the accompanying descriptive matter, in which there is illustrated and described preferred embodiments of the invention. In the drawings:

Figure 1:
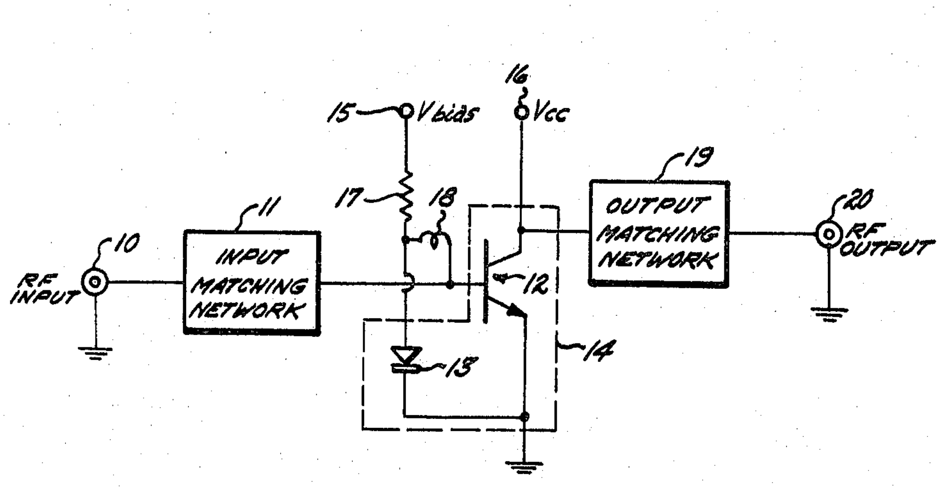
FIGURE 1 shows one embodiment of this invention partly in schematic and partly in block diagram form.

Now referring to FIGURE 1, there is shown R.F. (radio frequency) input terminal 10 receiving the signal to be powe amplified. The input signal is fed to the base of high frequency power transistor 12 by way of matching network 11. The biasing voltage, V bias, for transistor 12 is received by terminal 15 and is applied to the base of transistor through radio frequency choke 18 by way of the series arrangement of resistor 17 and the temperature compensating diode 13. A preselected collector voltage $V_{co}$ is received at terminal 16 and applied to the collector of transistor 12. The emitter is connected directly to ground. Compensating diode 13 is shown with its cathode connected to the emitter of transistor 12 and its anode connected to the junction of resistor 17 and radio frequency choke coil 18. R.F. (radio frequency) output terminal 20 is interconnected to the collector of transistor 12 by way of output matching network 19.

Transistor 12 and diode 13 are incorporated together in transistor package 14. Transistor package 14 may be a module. Diode 13 is spaced closely to transistor 12. The temperature coefficient of diode 13 is similar to the base-to-emitter junction temperature coefficient of the transistor, thus the quiescent collector current can be maintained relatively constant with temperature coefficient. Due to the close spacing of the diode to the transistor pellet, a fast thermal response time maintains a stable quiescent point and prevents the transistor from going into forward bias second breakdown and thermal runaway.

Figure 2:
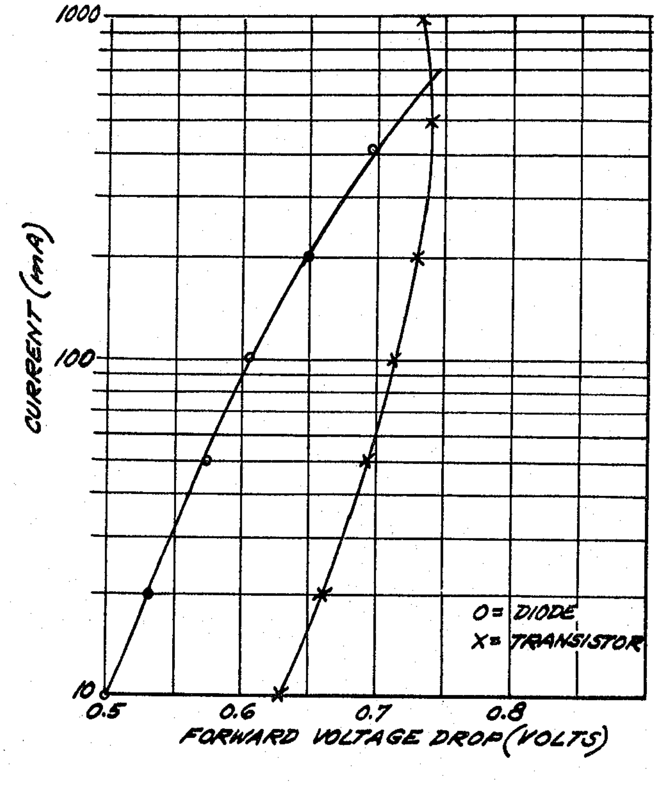
FIGURE 2 shows a plot of $I_c$ vs. $V_{be}$ and the diode forward characteristics relating to FIGURE 1.
Figure 3:
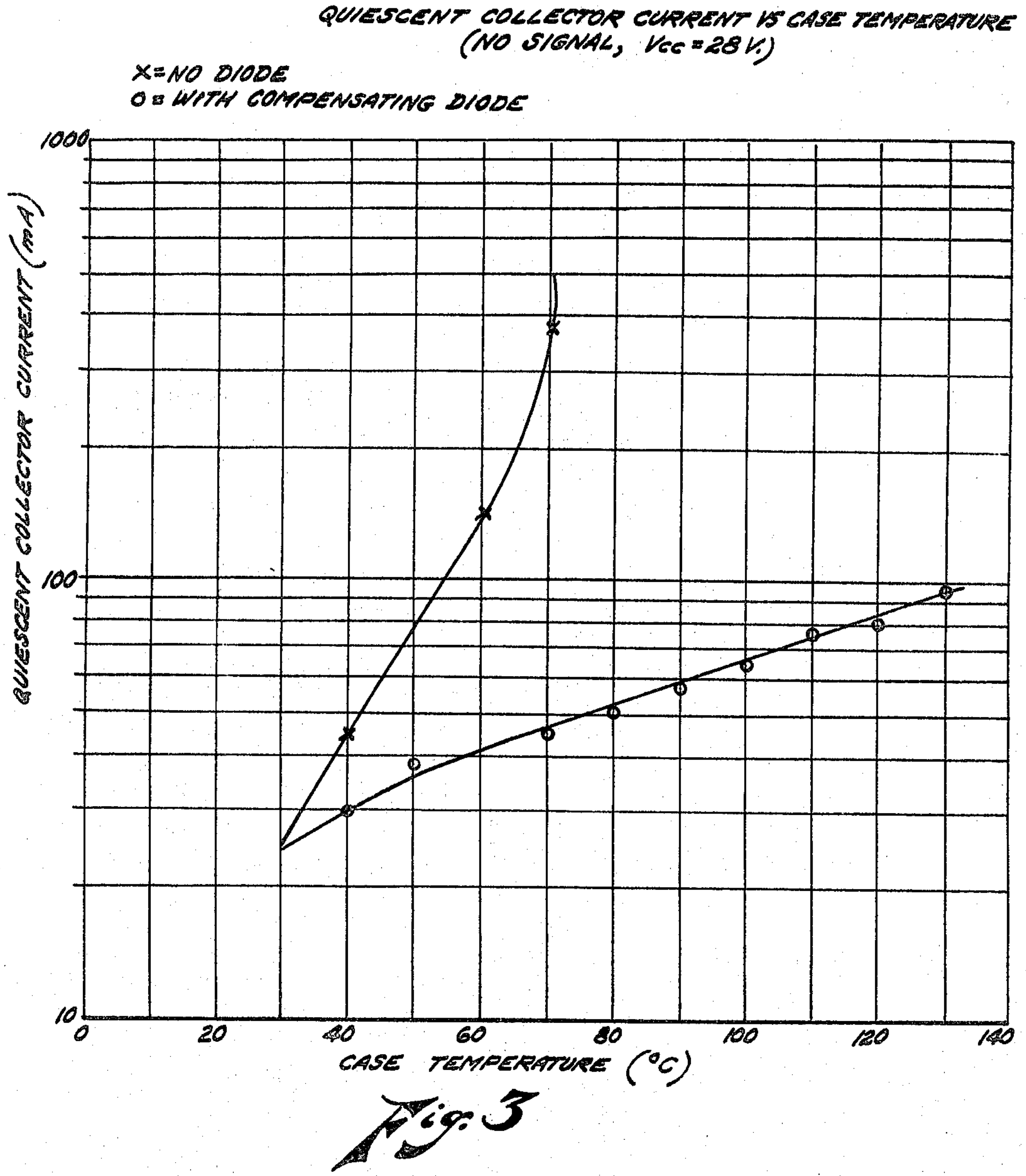
FIGURE 3 shows curves of the variation of collector current, with and without the compensating diode for the embodiment shown in FIGURE 1.

The embodiment of FIGURE 1 shows an active use with the diode in parallel with the base-to-emitter junction of the transistor. A plot of the $I_c$ vs. $V_{be}$ and the diode forward characteristics in FIGURE 2 indicates that in order to forward bias the transistor to a collector current of 25 ma., the diode current should be 280 ma. to establish the necessary bias voltage. The variation of collector current, with and without compensating diode, is shown in FIGURE 3. For this application a high conductance diode is used.

Figure 4:
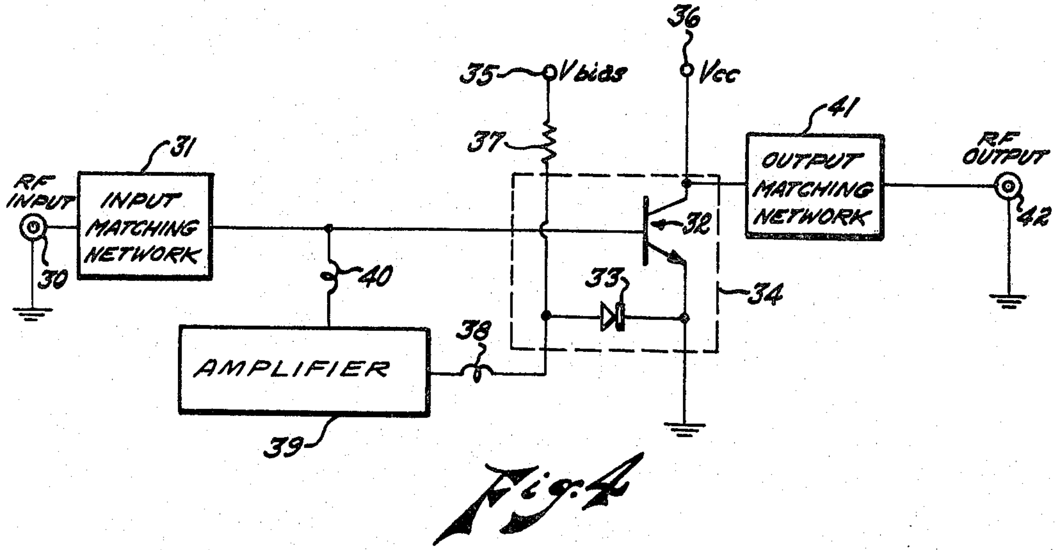
FIGURE 4 shows a second embodiment of the present invention partly in schematic and partly in block form.

Now referring to FIGURE 4, there is shown R.F. input terminal 30 which receives an input signal to be power amplified. Matching network 31 interconnects R.F. input terminal 30 and the base of high frequency power transistor 32. The emitter of transistor 32 is connected to ground. Terminal 35 receives bias voltage, V bias, which is fed to the anode of compensating diode 33 by way of resistor 37. The cathode of diode 33 is connected to the emitter of transistor 32. Terminal 36 receives a preselected collector voltage $V_{cc}$, and this is connected to the collector of transistor 32. Output matching network 41 interconnects the collector and R.F. output terminal 42. Amplifier 39 is connected to the anode of diode 33 by way of radio frequency choke coil 38 and is connected to the base of transistor 32 by way of radio frequency choke coil 40.

Transistor package 34 has also incorporated therein diode 33. Diode 33 is closely spaced to transistor 32 and packaged therewith in the same manner as for the first embodiment of this invention.

Figure 5:
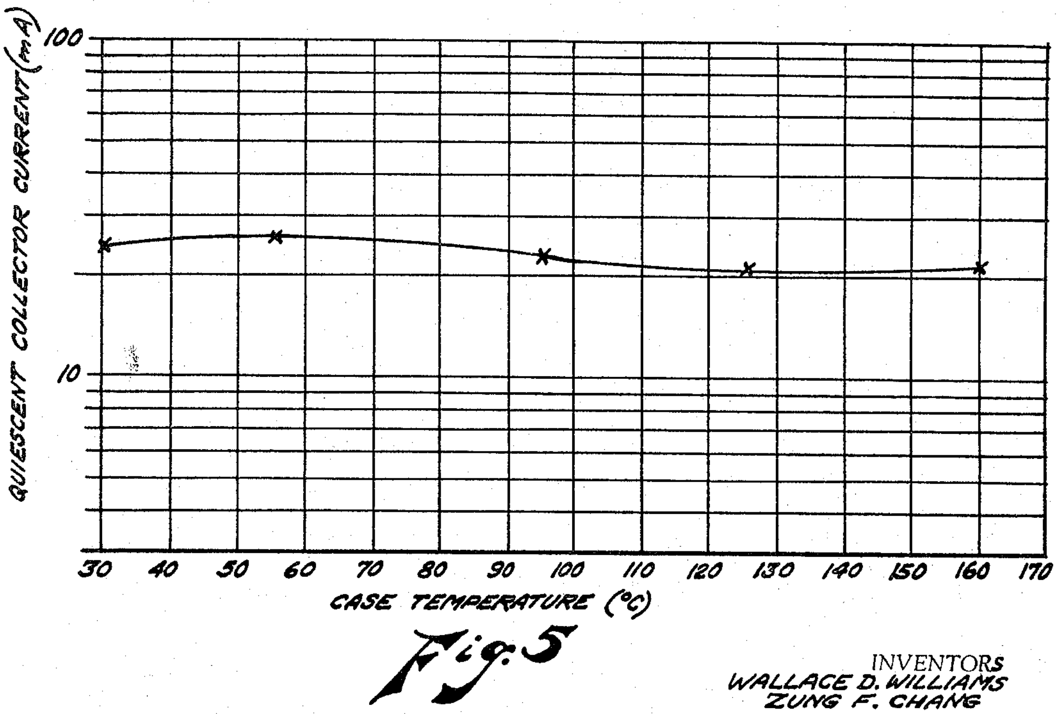
FIGURE 5 shows a plot of the stability of collector current vs. case temperature of the transistor package relating to the embodiment of FIGURE 4.

Instead of using the diode to establish a "stiff" voltage source, diode 33 is used in this instance as a temperature sensing element by passing a very small current through it—due to temperature is fed through amplifier 39 which gain through external unity-voltage current amplifier 39 which supplies the necessary bias voltage to the base of power transistor 32, thereby supplying the required compensation. By properly choosing the diode current overcompensation or under-compensation can also be obtained. The temperature coefficient of a small diode varies from −2.2 mv./° C. to −1.8 mv./° C. with a 1 to 50 ma. current change respectively. FIGURE 5 shows the plot illustrating stability of collector current vs. case temperature of package 34. The embodiment illustrated in FIGURE 4 shows a passive use. Either a high or low conductance diode can be used for this application.

Numerous objects and advantages of the invention have been set forth in the foregoing description, together with details of the structure and function of the invention, and the novel features thereof are pointed out in the appended claims. This disclosure, however, is illustrative only, and changes may be made in detail, and arrangement of parts, within the principle of the invention to the full extent indicated by the broad general meaning of the term in which the appended claims are expressed.

What we claim is:

1. Thermal bias shift compensation apparatus in a high frequency transistor power amplifier, means to receive a high frequency signal to be power amplified by said transistor, an input matching network interconnecting said receiving means with the base of said transistor, the emitter of said transistor being connected to ground, a diode having an anode and cathode with a bias voltage being received by said anode and said cathode being connected to said emitter of said transistor, said diode having a preselected small current passing therethrough normally to permit said diode to operate as a temperature sensing element, an output matching network interconnecting the collector of said transistor with an output terminal, said collector receiving a preselected voltage, a transistor package with said diode incorporated in said package and a closely spaced from said transistor to permit a first compensation in the form of a fast thermal response therebetween to maintain a stable quiescent operating point for said transistor amplifier, and an amplifier interconnecting the anode of said diode and the base of said transistor operating to amplify the variation of the voltage of said diode due to temperature to supply a second compensation in the form of a bias voltage to the base of said transistor.

2. Thermal bias shift compensation apparatus in a high frequency transistor power amplifier as defined in claim 1, wherein said bias voltage passes through a resistor before being received by said anode of said diode, a first radio frequency choke coil interconnecting said amplifier to said anode of said diode, and a second radio frequency choke coil interconnecting said amplifier to said base of said transistor.

3. Thermal bias shift compensation apparatus in a high frequency transistor power amplifier, means to receive a high frequency input signal, a transistor having base, collector, and emitter, an input matching network interconnecting said base and said receiving means, a bias voltage being supplied to said base by a series arrangement of a resistor and radio frequency choke coil, said emitter being connected to ground, said collector being connected to an output terminal by way of an output matching network, said collector also receiving a preselected voltage, a diode having an anode and cathode with said anode connected to the junction of said series arrangement of said resistor and radio frequency choke coil, said diode having a temperature coefficient decreasing at the same rate as the base, emitter voltage of said transistor with increasing temperature to permit a first compensation in the form of a constant quiescent transistor collector current during temperature variations, and a package incorporating said transistor and said diode with said diode closely spaced to said transistor to provide a fast thermal response therebetween operating as a second compensation.

References Cited

UNITED STATES PATENTS 3,302,124 1/1967 Dix ________________ 330—23

ROY LAKE, *Primary Examiner.*

L. J. DAHL, *Assistant Examiner.*